Nov. 16, 1937.   W. G. CROCKER   2,099,002
ELECTRICAL MEASURING SYSTEM
Filed March 11, 1935   2 Sheets—Sheet 1

INVENTOR
William Gordon Crocker
BY
Byrnes, Stebbins & Blenks
ATTORNEYS

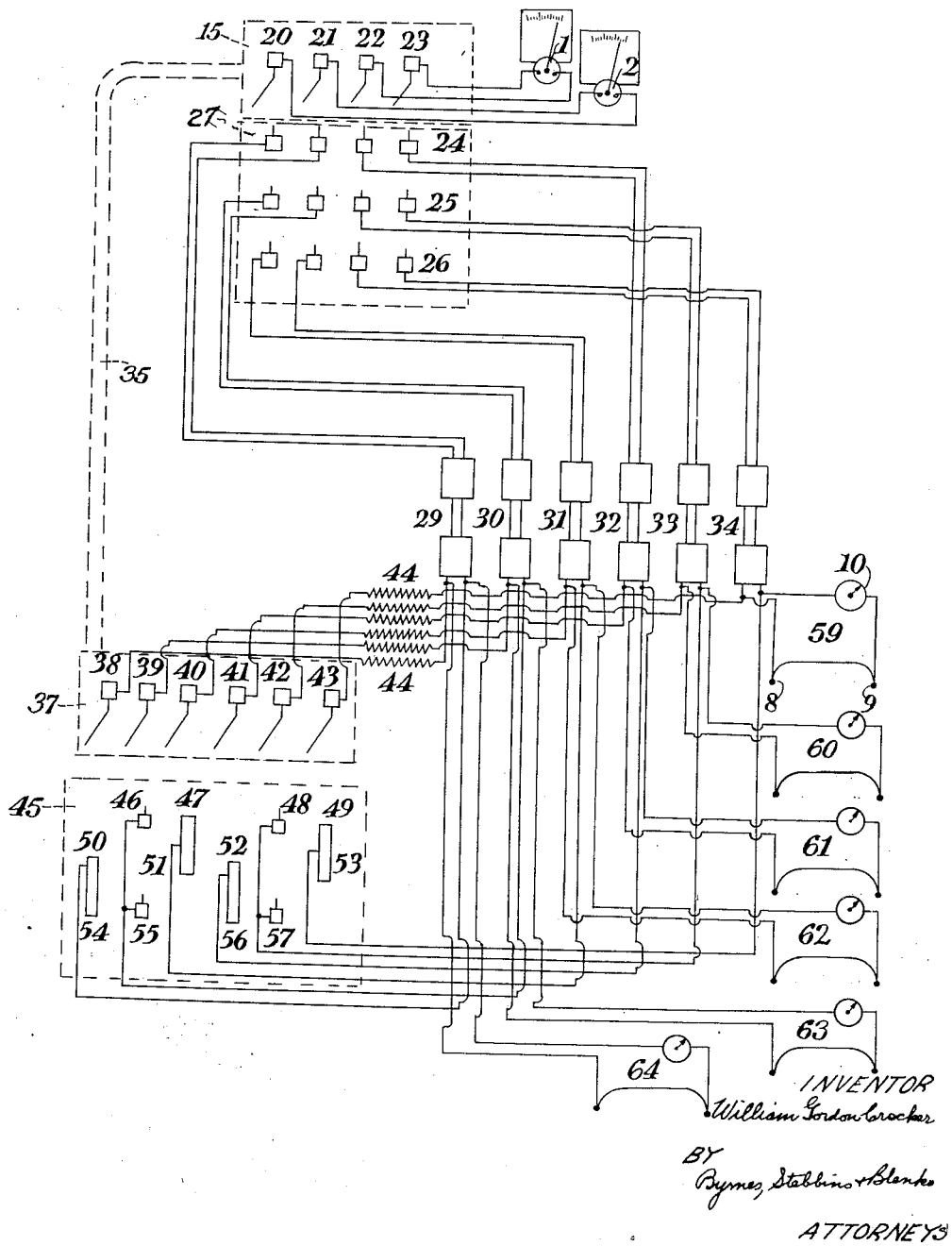

Patented Nov. 16, 1937

2,099,002

UNITED STATES PATENT OFFICE 2,099,002

ELECTRICAL MEASURING SYSTEM

William Gordon Crocker, Kent, England, assignor to Callender's Cable and Construction Company, Limited, London, England, a British company Application March 11, 1935, Serial No. 10,540
In Great Britain March 20, 1934

1 Claim. (Cl. 171—95)

This invention is applicable to cases where an electrical recording or indicating instrument located at some point is switched in succession into several circuits to make records or give indications of the condition of each circuit. Such devices are usually controlled by a clock or other timing device so as to make the changes at regular intervals and it will be seen that each circuit is only connected with the instrument for a fraction of the total time and when disconnected no evidence is given of the conditions in that circuit. The instrument may, for instance, record the temperature existing at three different places, the change over being made at intervals of one minute. In such a case the attendants are without evidence as to the condition at each point during two-thirds of the time. It is the object of the present invention to give, in addition to the temporary records or indications, continuous indications or records of each of the quantities being measured. The additional instrument may conveniently be located at a place near that where the measured conditions exist or are controlled.

In accordance with the invention the circuit changing device of the main instrument is coupled with another switching device by which an impedance equal to that of the circuit of the main instrument is substituted for that instrument in all circuits other than the one actually occupied by the instrument. In addition another measuring device, either indicating or recording is arranged in each of the circuits. Each additional instrument can accordingly give a continuous indication or record of the condition of that circuit which is undisturbed except at the actual moment of change of connections.

The additional switching effects can be obtained by adding contacts to the circuit changing device for the main instrument or by providing a separate switch or switches operatively connected with the main circuit changing device.

The invention is further described and illustrated by way of example in the accompanying drawings wherein:—

Figure 3 is a diagram of connections illustrating the arrangement of the circuits and the operation of the circuit changing device.

Figure 1:
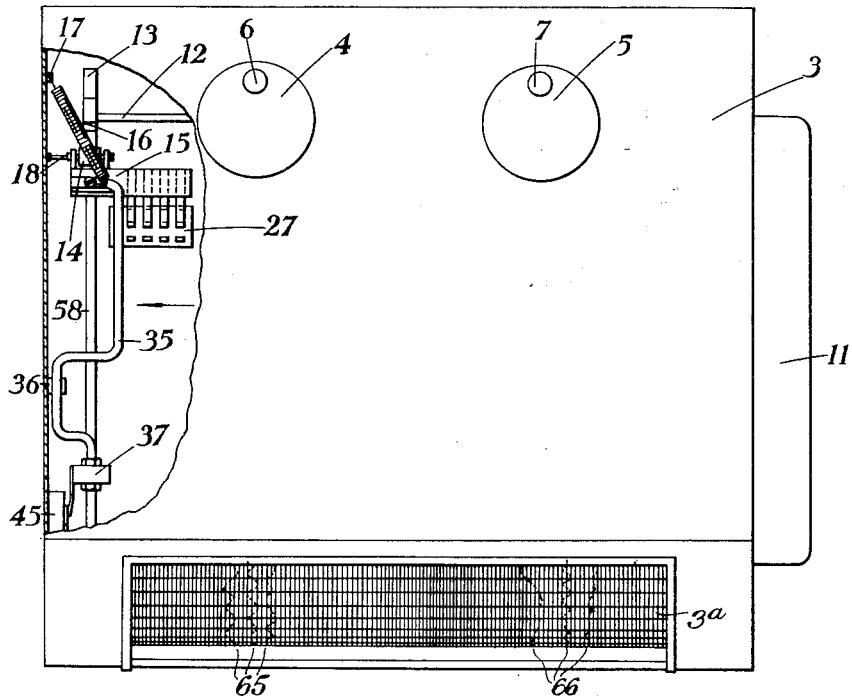
Figure 1 illustrates a double thermo-electric recording galvanometer, the cover of which is broken away to show the internal circuit changing device.

In Figure 1 there is shown schematically a known type of double thermo-electric recording galvanometer, comprising a casing 3 having two similar galvanometers housed therein, these being designated in the diagram of Figure 3 by the numerals 1 and 2 and their location in Figure 1 being indicated by the suspension extensions 4 and 5, respectively, these extensions having the customary clamping heads 6 and 7, each galvanometer being adapted for connection with three external circuits.

The recording drum for the instrument is diagrammatically illustrated at 3a and the instrument is intended to record temperature at six different places, all of which may be located remotely from the instrument as is apparent from the circuit diagram of Figure 3. At one side of the housing 3 is an enclosure 11 for a clock mechanism of any preferred type, this clock being connected to drive a shaft 12 so that it makes one complete revolution in three minutes, moving through steps of one third of a revolution at one minute intervals. This motion is transmitted to a cam 13 fastened to the shaft 12. The surface of the cam 13 is engaged by a roller 14 mounted on a block 15. A tension spring 16 attached at one end 17 to the instrument case and at the other end to the block 15, serves to keep the roller 14 always in contact with the cam. The block 15 is pivotally attached to one end of a lever 19, the other end of which is pivotally supported on a bearing pin 18 fixed to the instrument casing. Insulatedly arranged on the block 15 is a row of four contact fingers, represented at 20, 21, 22 and 23 in Figure 3, which are adapted to be always in engagement with one of three rows 24, 25 and 26 each comprising four contact studs insulatably mounted on a stationary block 27. A tension spring 28 connected between the fixed pivot 18 of the lever 19 and the block 15 ensures a good contact between the fixed and movable contact members.

As indicated in Figure 3 two of the four contacts, namely 20 and 21, arranged on the block 15 are permanently connected with the galvanometer 2, the remaining two contacts 22 and 23 being similarly connected to the other galvanometer 1. Further, the fixed contacts mounted in three rows, 24, 25, and 26 on the stationary block 27 are permanently connected in pairs over six suitable terminal blocks 29, 30, 31, 32, 33, and 34 with the six external circuits which have to be connected successively two at a time with the two galvanometers 1 and 2. These six external circuits are diagrammatically represented in Figure 3 by the numerals 59, 60, 61, 62, 63, and 64 and each comprises a pyrometer consisting of a temperature indicating instrument 10 and a thermo-couple, namely, a cold junction 8 and a hot junction 9. As shown in Figure 3 the circuit 59 is permanently connected with the right hand pair of contacts in the row 26 on the stationary block 27 in the manner above described, and the circuits 60 and 61 are similarly connected with the right hand pairs of contacts in the rows 25 and 24, respectively. In the same manner the circuits 62, 63, and 64 are permanently in connection with the left hand pairs of contacts in the rows, 26, 25, and 24, respectively.

As indicated in Figure 3 two of the movable contacts 20 and 21 are connected to the galvanometer 2, the other two movable contacts 22 and 23 being connected to the other galvanometer 1. Further the four fixed contacts in each row 24, 25 and 26 are connected in pairs over the terminal blocks 29, 30, 31, 32, 33 and 34 with the external circuits. For instance the external circuit containing the thermo-couples 8 and 9 and the pyrometer 10 is joined through the terminal block 34 with the right hand pair of fixed contacts of the row 26.

Mounted on the block 15 is an extension rod 35, which has a similar oscillatory movement as imparted by the cam 13, and slides in a guide bearing 36 fixed to the inner wall of the instrument. Arranged on the block 37 is a row of six contact fingers, 38, 39, 40, 41, 42 and 43 which, in accordance with the movement of the rod 35 occupy respectively three positions wherein they make contact with one of three rows of four contacts, namely 46 to 49, 50 to 53, and 54 to 57, all of which are mounted on a stationary block 45. Each of the moving contact fingers 38 to 43 is connected to one of the external circuits at the corresponding terminal block over one of a group of six impedances, 44, each of which is equal in value to that of each galvanometer 1 and 2. Thus for example the movable contact 43 is connected through one of the impedances 44 to one side of the external circuit 59 at the terminal block 34. The other side of each external circuit is connected at a terminal block to two of the stationary contacts located respectively in two of the rows of contacts mounted on the stationary block 45. Thus, for example the contacts 49 and 53, being in adjacent rows and connected together are joined at the terminal block 34 to the other side of the external circuit 59.

The operation of the arrangement described is as follows:—During the first minute of a three minute cycle, the roller 14 being in engagement with the lowest step of the cam 13, the row of contacts 20—23 on the block 15 will engage the first row of fixed contacts 24 on the block 27. From Figure 3 it will be seen that in this position the external circuits 64 and 61 connected to the terminal blocks 29 and 32 will be closed through the galvanometers 2 and 1 respectively. At the same time the contacts 39, 40, 42 and 43 mounted on the movable block 37 engage the fixed contacts 46, 47, 48 and 49, so that the external circuits 63, 62, 60, and 59 corresponding to the terminal blocks 30, 31, 33 and 34 will be closed each through one of the impedances 44.

During the second minute of the cycle the cam 13 having been rotated by means of the shaft 12, the roller 14 will engage the intermediate step on the cam. The movable rows of contacts now engage the intermediate row of fixed contacts in each case, which is the position illustrated in Figures 1 and 2. In this position the external circuits 63 and 60 corresponding to the terminal blocks 30 and 33 will be closed through the galvanometers 2 and 1 respectively, and the remaining four external circuits 64, 62, 61, and 59 will be closed through an impedance 44. In the third and last portion of the cycle it will be seen that the remaining pair of external circuits, 62 and 59, will be connected to the galvanometers. At the end of the cycle the roller 14 again engages the lowest step of the cam 13 and the three stage cycle is repeated.

Figure 2:
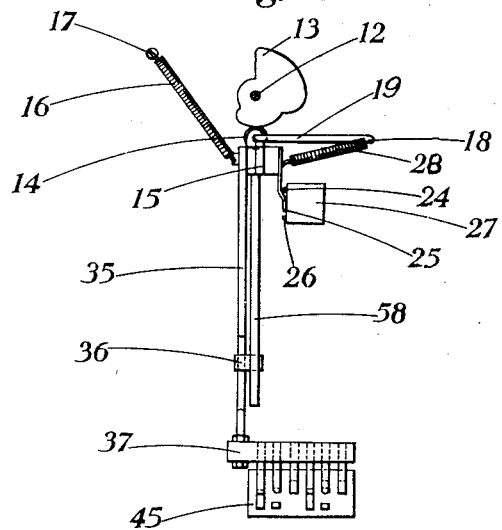
Figure 2 is a view of the circuit changing device looking in the direction of the arrow in Figure 1.

The indicating instrument 10 in each of the external circuits will be located at that point at which the temperature is to be controlled. By virtue of the switching arrangement described, whereby each external circuit is closed through a galvanometer 1 or 2 for one minute in every three minutes and through an impedance equal in value to that of the galvanometer circuit for the remaining two minutes, the circuit through the indicating instrument 10 is always maintained closed and a continuous reading of the temperature is always available. At the same time the thermo-electric recording instrument produces in a well-known manner on the recording drum 3a six graphic records in two groups, represented by the numerals 65 and 66, which correspond to the galvanometers 1 and 2 respectively. Such records are usually produced in distinctive colors obtained by any preferred type of tri-color inking tape mechanism which may be controlled by a rod 58, which as shown in Figures 1 and 2 may be rigidly connected with the movable block 15 and consequently will operate in synchronism with this and the members connected therewith.

By the invention therefore, in the case illustrated six other indicating instruments, each showing the temperature at one of the six points dealt with, can be provided adjacent to the control apparatus for that temperature and each of these instruments will then show continuously the condition at one point while the recording instrument will continue to give an intermittent record of the conditions at the six points.

What I claim as my invention and desire to secure by Letters Patent is:— .

In an apparatus for electrically measuring the value of the electrical commodity in several electrical circuits which can be switched singly and temporarily into connection with a main measuring instrument, the combination with the switching means of an additional measuring instrument in each of said circuits, several impedances, each equal to the impedance of the main instrument, and means operatively associated with said switching means for connecting separately with each of said circuits one of the said impedances while each of said circuits is disconnected from the main instrument.

WILLIAM GORDON CROCKER.